(12) United States Patent
Kose

(10) Patent No.: US 10,731,892 B2
(45) Date of Patent: Aug. 4, 2020

(54) FLEXIBLE VENTILATION DUCT AND A RELATED PRODUCTION METHOD

(71) Applicant: ISIL MUHENDISLIK MAKINA VE INSAAT SANAYI TICARET ANONIM SIRKETI, Pendik, Istanbul (TR)

(72) Inventor: Hikmet Kose, Istanbul (TR)

(73) Assignee: ISIL MUHENDISLIK MAKINA VE INSAAT SANAYI TICARET ANONIM SIRKETI, Istanbul (TR)

(*) Notice: Subject to any disclaimer, the term of this patent is extended or adjusted under 35 U.S.C. 154(b) by 162 days.

(21) Appl. No.: 15/502,459

(22) PCT Filed: Aug. 3, 2015

(86) PCT No.: PCT/TR2015/050053
§ 371 (c)(1),
(2) Date: Feb. 7, 2017

(87) PCT Pub. No.: WO2016/024932
PCT Pub. Date: Feb. 18, 2016

(65) Prior Publication Data
US 2017/0227248 A1 Aug. 10, 2017

(30) Foreign Application Priority Data
Aug. 13, 2014 (TR) .................. 2014 09471

(51) Int. Cl.
| | |
|---|---|
| *F16L 11/08* | (2006.01) |
| *F24F 13/02* | (2006.01) |
| *B32B 27/36* | (2006.01) |
| *B32B 15/085* | (2006.01) |
| *B32B 15/09* | (2006.01) |
| *B32B 15/20* | (2006.01) |
| *B32B 1/08* | (2006.01) |
| *B32B 15/02* | (2006.01) |
| *B32B 27/32* | (2006.01) |
| *B32B 25/00* | (2006.01) |

(52) U.S. Cl.
CPC ............ *F24F 13/0218* (2013.01); *B32B 1/08* (2013.01); *B32B 15/02* (2013.01); *B32B 15/085* (2013.01); *B32B 15/09* (2013.01); *B32B 15/20* (2013.01); *B32B 25/00* (2013.01); *B32B 27/32* (2013.01); *B32B 27/36* (2013.01); *F16L 11/081* (2013.01); *F24F 13/0245* (2013.01); *F24F 13/0263* (2013.01); *B32B 2262/0276* (2013.01); *B32B 2307/304* (2013.01); *B32B 2597/00* (2013.01)

(58) Field of Classification Search
USPC .......................................................... 156/143
See application file for complete search history.

(56) References Cited

U.S. PATENT DOCUMENTS

| | | | | |
|---|---|---|---|---|
| 3,434,502 A | * | 3/1969 | Snelling .................. | F16L 59/02 138/129 |
| 3,554,237 A | | 1/1971 | Pelley et al. | |
| 3,607,517 A | * | 9/1971 | Pelley ..................... | F16L 11/24 156/195 |
| 3,846,202 A | * | 11/1974 | Clarke ...................... | B31C 3/00 156/143 |
| 4,012,272 A | * | 3/1977 | Tiner ...................... | B29C 53/785 156/429 |
| 4,149,924 A | * | 4/1979 | Grobard ................ | B29C 53/785 156/143 |
| 5,607,529 A | * | 3/1997 | Adamczyk ............ | B29C 53/582 138/149 |
| 2006/0051547 A1 | | 3/2006 | Lim | |
| 2007/0235101 A1 | * | 10/2007 | Liebson .................. | D06F 58/20 138/131 |
| 2008/0060404 A1 | * | 3/2008 | Donnelly .............. | B29C 53/785 72/135 |

FOREIGN PATENT DOCUMENTS

| | | | |
|---|---|---|---|
| WO | 2012 060795 A1 | | 5/2012 |
| WO | WO-2012/060795 A1 | * | 5/2012 |

\* cited by examiner

*Primary Examiner* — Jeffry H Aftergut
(74) *Attorney, Agent, or Firm* — Craft Chu PLLC; Andrew W. Chu

(57) ABSTRACT

A flexible ventilation duct production method includes forming an inner layer using at least one of aluminum PET, polyester, metalized OPP, metalized polyester and PVC; forming an insulation layer comprised of rubber, polyethylene liners, polyester fibers or similar insulation materials; assembling a steel wire taking shape from being spirally wound around a cylinder; forming an outer layer using at least one of aluminum PET, polyester, metalized OPP, metalized polyester and PVC; and laminating by being wound to a constantly rotating cylindrical shaft in a certain order to form an integrated, holistic structure between all the factors, which is constantly rotated around its own axis in strip plates and is constantly fed to the mentioned cylindrical shaft, by meanwhile providing complete lamination with the applied chemicals.

5 Claims, 1 Drawing Sheet

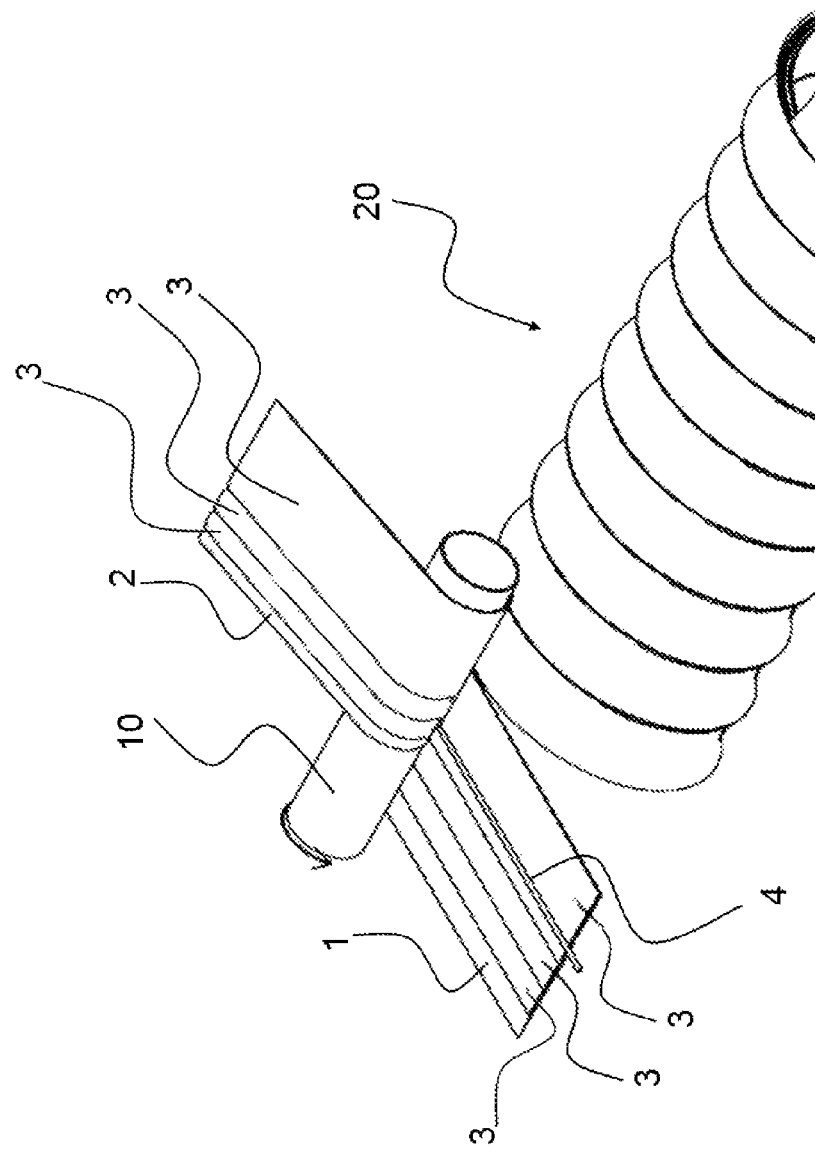

FLEXIBLE VENTILATION DUCT AND A RELATED PRODUCTION METHOD

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to a flexible ventilation duct used in carrying conditioned air from main ventilation ducts to environments to be climatized.

More specifically, the present invention is a highly stressed steel wire reinforced flexible ventilation duct, of which the inner and outer layer comprises of one or more of aluminum PET, polyester, metalized OPP, metalized polyester and/or PVC, and is produced by being completely laminated between these layers with at least one insulation material such as rubber, polyethylene liners and polyester fibers.

2. Description of Related Art Including Information Disclosed Under 37 CFR 1.97 and 37 CFR 1.98

An inner pipe (wired spiral flexible ventilation duct), an outer jacket and glass wool as an insulation material between these two materials are used in insulated flexible ventilation ducts used for carrying conditioned air to a climatized environment through a main ventilation duct in ventilation systems. As the process of pulling glass wool and the outer jacket onto the inner pipe is done by hand when said structure is being formed, these products structurally have many inadequacies.

During the assembly of prior art flexible ventilation ducts to the main ventilation ducts, the inner pipe is primarily attached to the main ventilation duct with brackets and a band. The glass wool and outer jacket, which were peeled back for the inner pipe to be attached, are pulled back onto the inner pipe. The assembly thereof onto the main ventilation duct is carried out by applying brackets and a band once again on the outermost part. This leads to a substantial amount of labor and loss of time.

In cases, where the inner pipe is not well attached to the main ventilation duct in the prior art flexible ventilation ducts, the glass wool begins to directly come in contact with air. This situation causes the glass wool to, in time, collect dust. In the case of the dust being carried to the ambient air, in which people live, through the ventilation system, this is hazardous to human health, and also subtly reduces the quality of human living space due to its allergic effect.

During post-assembly inspections, it is not possible to determine whether the connection to the main ventilation duct has been done correctly by looking from the outside, as the inner pipe is not laminated with an insulation material or outer jacket in the prior art flexible ventilation ducts. In order to carry out this inspection, it is necessary to completely remove the insulated flexible ventilation duct from the main duct and to assemble it correctly. This leads to a substantial amount of labor and loss of time.

As the insulation material used in the flexible ventilation ducts found in the prior art is not completely laminated between the inner pipe and the outer jacket, air circulates between them. In time, this circulation destroys the glass wool and damages the insulation quality. This causes the loss of heat to increase by creating adverse effects on the insulation. Additionally, air circulation causes the loss of heat to increase by forming thermal bridges.

Possible wearing and tearing of the outer jacket causes air to circulate between the outer jacket and the insulation material in insulated flexible ventilation ducts. In time, this circulation leads to the destruction and deterioration in the insulation material by causing dampness and dust. This situation increases the loss of heat. At the same time, the glass wool, which collects dust, caused allergic effects by being spread to the environment.

Various studies have been carried out in order to eliminate the mentioned disadvantages of the prior art. U.S. Pat. No. 5,806,567 discloses a heat insulated hose. This is a heat insulated hose, which comprises an approximately cylindrical inner layer having a helical cavity portion formed by unbonded overlapping of a part of a polyvinyl chloride band material, helical reinforcing wire of hard resin incorporated inside the cavity portion, a heat insulating layer made of a foam resin band which is helically wound around the cavity portion at the same pitch as the cavity portion, and an outer layer made from a soft polyvinyl chloride band covering an outer periphery of the heat insulating layer. The reinforced wire is a double layer wire including a core wire of polyolefin resin and a cover layer of soft polyvinyl chloride covering an outer periphery of the core wire, and the cover layer is made to adhere to an inner wall portion of the cavity portion with use of an adhesive agent or by thermal fusing.

In the mentioned solution, the structure of the wire used in the structuring of the heat insulated hose is especially mentioned. However, as the technical issues defined above were not mentioned, a particular technique regarding how these will be solved was also not suggested. The document only focuses on the structure of the wire used in the heat insulated hose and emphasizes that this wire is different from those similar in that it is double layered, comprising of an inner layer and a cover layer.

U.S. Pat. No. 5,785,091 discloses a flexible air duct with a diamond interlock scrim. A flexible insulated air duct is provided with a core of a helical wire encapsulated in a tape, an insulation blanket wrapped around the core, and a jacket with a diamond interlock scrim on the outside of the insulation blanket. The jacket is comprised of an inside layer, a diamond-interlock scrim, a parallel scrim, and an outer coat layer. The diamond-shaped scrim has yarns arranged in a criss-crossed pattern, while the parallel scrim has yarns arranged in parallel. The criss-crossed yarns are made from a heavier gauge material with better tensile strength than that of the parallel yarns. The inside layer, the parallel and criss-crossed yarns, and the outer layer are laminated together using an adhesive. The completed jacket is pulled over the insulation blanket and the inner core to form a flexible air duct having a jacket with a diamond interlock scrim. However, a solution to eliminate the technical issues is also not provided within this document.

U.S. Pat. No. 5,607,529 discloses an insulated flexible air duct and the process for manufacturing the same. An insulated flexible air duct comprises a flexible cylindrical core; a layer of fibrous insulation blanket surrounding the flexible core and comprising a strip of fibrous blanket helically wrapped about the flexible core with lateral portions of successive convolutions of the insulation strip overlapping so that the air duct can be flexed without forming a gap between the successive convolutions of the insulation strip; and a vapour barrier jacket comprising a strip of plastic jacket film helically wrapped about the layer of fibrous insulation. The insulated, flexible air duct is formed in one continuous operation. As the flexible core is formed it is rotated about its longitudinal axis. The rotating core is fed in an axial direction through an insulation wrapping station and a vapor barrier jacket wrapping station where the fibrous insulation strip is wrapped about the core and the vapor barrier strip is helically wrapped about the insulation to form the air duct. Obtaining the insulated, flexible ventilation duct obtained in the mentioned method in one operation enables the ventilation duct mentioned in the prior art to be produced in a more practical manner. However, the technical issues brought by this structure are not resolved.

As a result, the inadequacy of solutions in the prior art regarding an air tight, fireproof, environmentally friendly, non-dust-forming, flexible, bendable, compressible, less space occupying and easier to assemble flexible ventilation duct have rendered it necessary to put forward a new solution in this field.

BRIEF SUMMARY OF THE INVENTION

The object of the invention is to provide a flexible ventilation duct having a holistic, single piece structure with the complete lamination of the inner layer, steel wire, insulation wire and outer layer during the production thereof, and enabling the opportunity to use different insulation materials having additional acoustic insulation properties as an alternative to glass wool.

Another object of the invention is to obtain a flexible ventilation duct which can be assembled to main ventilation ducts in one go with the holistic structure obtained after production, does not allow air circulation between the insulation layer and other layers due to there not being a space between the layers, and thus, does not allow any tearing and consequently any dust formation.

A further object of the invention is to provide a flexible ventilation duct which both provides efficient usage of the area, where the main ventilation duct is assembled, and also reduces the transportation costs of carrying it from the production area to the end user to the minimum with it taking up a lot less space compared to products of the prior art (with it being produced in the desired insulation thickness).

An even further object of the invention is to provide a flexible ventilation duct which may provide acoustic insulation without requiring an additional cost or production process, and may also provide hygienic products for custom areas such as hospitals with chemicals that do not have any health hazardous properties and can be easily applied to the surface coming in contact with air of the inner layer, in addition to providing efficient heat insulation.

BRIEF DESCRIPTION OF THE SEVERAL VIEWS OF THE DRAWINGS

The FIGURE is a perspective view depicting the production method of the flexible ventilation duct of the invention, and the obtained product thereof.

REFERENCE NUMBERS

1. Inner layer
2. Outer layer
3. Insulation layer (insulation material)
4. Steel wire
10. Shaft
20. Flexible ventilation duct

DETAILED DESCRIPTION OF THE INVENTION

As seen in the FIGURE, the flexible ventilation duct of the invention comprises of an inner layer (1) forming a tubular inner volume to direct the conditioned air to an environment to be climatized from a main air duct, and an insulation layer (2) and an outer layer (3) enabling the insulation of conditioned air. The said invention is obtained by laminating the inner layer (1) and the outer layer (2) on top of each other such that an insulation material (3) stays between strip plates formed of at least one or more of aluminum PET, polyester, metalized OPP, metalized polyester and/or PVC. The mentioned inner and outer layers (1 and 2) comprise at least one insulation material (3) laminated so as to form an inseparable entirety therebetween, and steel wire (4) enabling the formed structure to maintain its cylindrical tubular shape and to have a flexible structure. Steel wire (4) spirally wound to the inner structure during production provides both shape and flexibility to the ventilation duct. At the same time, as the insulation layer (3) is comprised of more than one insulation materials, it enables the structure to maintain its flexibility. As seen in the FIGURE, additional insulation materials (3) may be added to the production process according to the desired amount and type of insulation in the inner part of the flexible ventilation duct (20) of the invention. Due to the production method of the invention, all kinds of insulation materials, such as rubber, polyethylene liners, polyester fibers, etc. are used as insulation materials. Thus, the flexible ventilation duct (20) of the invention, comprising all of the inner, outer and insulation layers (1, 2 and 3) at once and the steel wire (4) during production, and obtaining a holistic structure as a result of production is obtained.

A flexible ventilation duct (20) may be produced, which is of a holistic, single piece structure inseparably laminated due to chemicals applied therebetween by winding an inner layer (1) using strip plates in the form of at least one or more of aluminum PET, polyester, metalized OPP, metalized polyester and/or PVC; an insulation layer (3), steel wire (4) and an outer layer (2) using at least one or more of aluminum PET, polyester, metalized OPP, metalized polyester and/or PVC as in the mentioned inner layer (1) onto a rotary, cylindrical shaft (10). The insulation layer (3) may comprise the same or different kinds of insulation materials (3) of one or more layers in a desired thickness. This is a very important factor providing flexibility to the insulation layer (3). If the insulation layer (3) is not flexible, it is not possible to speak of the flexibility of insulated flexible ventilation ducts. As the present invention is of a holistic structure, it is not necessary to attach it to the main ventilation duct as in the prior art. It may be readily assembled to the main ventilation duct in one go with the brackets and band from the outermost part. This situation saves a substantial amount of time and provides major advantages compared to prior art products by reducing the costs of labor necessary for assembly, and also provides a form of assembly which is of higher quality.

The holistic structure obtained due to the production process applied in the present invention does not allow the air directed from the main ventilation duct to come in contact with the insulation layer of the insulated flexible ventilation duct in any way. Additionally, as different materials with better insulation and hygiene properties which are an alternative to glass wool and are one of the advantages provided by the production method may be used as insulation materials, factors which may damage human health are eliminated. Checking after the assembly is not necessary. As it is may be readily understood whether it is connected to the main ventilation duct with the method of checking by looking from the outside. Less heat loss occurs in the present invention as the outside diameter is less compared to the others. Additionally as the insulation material is completely laminated, there is no air circulation between the inner layer (1), insulation layer (3) and outer layer (2) in the holistic structure. This situation enables there to be much less heat loss.

Possible wearing and tearing which may occur because of the completely laminated production process of the invention remain in a local region and do not cause air circulation. Thus, there is no distortion in the structure of the duct. Thus, there is no distortion in the structure of the insulation layer (3) either, and does not cause any allergic affect.

As the outside diameter of the present invention is less compared to other flexible ventilation ducts, it is easier to be applied even in narrow areas. Additionally, it provides a substantial transportation advantage as it takes up less volume. It eliminates all of the adverse effects which other flexible ventilation ducts create. Acoustic insulation is easier in the present art. A barrier layer is additionally applied around the inner pipe to provide acoustic insulation in the prior art. However, rubber being one of the insulation materials used in the present art has acoustic insulation by its own nature. Thus, an additional layer is required for acoustic insulation.

As a result, a holistic, completely laminated flexible ventilation duct, which may be assembled at one go, i.e. without requiring another additional process after production is obtained. Thus, it provides many advantages not put forward in the prior art such as being hygienic, being of high insulation quality, having high thermal performance, having various materials, being non-dust-forming, being easy to assemble, not being affected by dampness, being environmentally friendly, being non-allergenic, having a transportation advantage and being able to be applied in a narrow area.

I claim:

1. A method for a producing a flexible ventilation duct to be connected to main ventilation ducts so as to carry conditioned air to environments to be climatized, the method comprising the steps of:
    forming an inner layer being comprised of at least one of a group consisting of: aluminum polyethylene terephtalate, polyester, metalized oriented polypropylene, metalized polyester and polyvinyl chloride;
    forming an outer layer being comprised of at least one of a group consisting of: aluminum polyethylene terephtalate, polyester, metalized oriented polypropylene, metalized polyester and polyvinyl chloride on an outermost part;
    assembling an insulation layer between said inner layer and said outer layer; and
    winding a steel wire disposed on said inner layer and within said insulation layer, together with said inner layer, said outer layer and said insulation layer so as to maintain structure and to provide flexibility, said inner layer, said outer layer, said insulation layer, and said steel wire being laminated to each other with chemicals in a single process so as to form an integrated structure.

2. The method for producing the flexible ventilation duct, according to claim 1, wherein said insulation layer is comprised of at least one insulation material of a group consisting of: rubber, polyethylene liners, and polyester fibers.

3. The method for producing the flexible ventilation duct, according to claim 2, wherein said insulation layer is further comprised of at least another insulation material different from said at least one insulation material.

4. The method for producing the flexible ventilation duct, according to claim 1, wherein said insulation layer has a desired thickness.

5. A method for a producing a flexible ventilation duct, the method comprising the steps of:
    forming an inner layer being comprised of at least one of a group consisting of: aluminum polyethylene terephtalate, polyester, metalized oriented polypropylene, metalized polyester and polyvinyl chloride;
    forming an insulation layer being comprised of at least one of a group consisting of rubber, polyethylene liners, polyester fibers and insulation materials;
    forming an outer layer being comprised of at least one of a group consisting of: aluminum polyethylene terephtalate, polyester, metalized oriented polypropylene, metalized polyester and polyvinyl chloride; and
    winding a steel wire disposed on said inner layer and within said insulation layer together with said inner layer and said outer layer so as to provide flexibility and to form an integrated holistic structure,
    wherein the step of winding said steel wire comprises:
    constantly feeding said inner layer, said insulation layer, said outer layer, and said steel wire disposed on said inner layer and within said insulation layer, to a cylindrical shaft, said cylindrical shaft having an axis;
    constantly rotating said cylindrical shaft around said axis; and
    providing chemicals to said inner layer, said insulation layer, said outer layer, and said steel wire within said insulation layer for complete lamination of said inner layer, said insulation layer, said out layer, and said steel wire.

* * * * *